United States Patent
Ahmadzadeh et al.

(10) Patent No.: US 9,961,496 B2
(45) Date of Patent: May 1, 2018

(54) METHODS AND SYSTEMS FOR CONTEXT BASED ANOMALY MONITORING

(71) Applicant: QUALCOMM Incorporated, San Diego, CA (US)

(72) Inventors: Seyed Ali Ahmadzadeh, San Jose, CA (US); Saumitra Mohan Das, Santa Clara, CA (US); Rajarshi Gupta, Sunnyvale, CA (US); Govindarajan Krishnamurthi, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/185,178

(22) Filed: Jun. 17, 2016

(65) Prior Publication Data

US 2017/0366935 A1    Dec. 21, 2017

(51) Int. Cl.
*H04W 24/00*    (2009.01)
*H04W 4/02*    (2018.01)
*H04W 4/00*    (2018.01)
*H04W 4/06*    (2009.01)
*H04M 1/725*    (2006.01)
*G08G 1/0968*    (2006.01)

(52) U.S. Cl.
CPC ...... *H04W 4/023* (2013.01); *G08G 1/096883* (2013.01); *H04M 1/72569* (2013.01); *H04M 1/72572* (2013.01); *H04W 4/005* (2013.01); *H04W 4/008* (2013.01); *H04W 4/06* (2013.01)

(58) Field of Classification Search
CPC .................................................... H04W 4/023
USPC ...................................................... 455/456.3
See application file for complete search history.

(56) References Cited

U.S. PATENT DOCUMENTS

| | | |
|---|---|---|
| 7,899,611 B2 | 3/2011 | Downs et al. |
| 8,903,593 B1 | 12/2014 | Addepalli et al. |
| 9,218,527 B2 | 12/2015 | Lakshminarayan et al. |

(Continued)

OTHER PUBLICATIONS

Gubbi J., et al., "Internet of Things (IoT): A Vision, Architectural Elements, and Future Directions," Jan. 10, 2013, pp. 1-19.

(Continued)

*Primary Examiner* — Joel Ajayi
(74) *Attorney, Agent, or Firm* — The Marbury Law Group, PLLC (57) ABSTRACT

Various embodiments include methods, and computing devices configured to implement the methods, for anomaly monitoring using context-based sensor output correlation. A computing device may obtain output of a first sensor and may determine that an anomaly is likely to occur based on the obtained output of the first sensor. The computing device may transmit a message indicating that the anomaly is likely to occur, causing receiving computing devices to begin logging output of sensors of the receiving computing devices. The computing device may determine whether the anomaly did occur. If the anomaly did occur, the computing device may transmit a sensor output request. Nearby computing devices may receive this sensor output request and may transmit collected sensor data to the first computing device. The first computing device may receive the sensor output collected by the various receiving devices and may correlate the first sensor output with the received sensor output.

30 Claims, 7 Drawing Sheets

(56) References Cited

U.S. PATENT DOCUMENTS

| | | | |
|---|---|---|---|
| 2010/0058469 A1* | 3/2010 | Yen | H04L 63/1416 |
| | | | 726/22 |
| 2012/0304007 A1 | 11/2012 | Hanks et al. | |
| 2014/0074315 A1 | 3/2014 | Frye et al. | |
| 2014/0380264 A1 | 12/2014 | Misra et al. | |
| 2015/0287311 A1 | 10/2015 | Smith et al. | |

OTHER PUBLICATIONS

International Search Report and Written Opinion—PCT/US2017/034496—ISA/EPO—dated Aug. 24, 2017.

* cited by examiner

FIG. 6

METHODS AND SYSTEMS FOR CONTEXT BASED ANOMALY MONITORING

BACKGROUND

Automobiles are increasingly utilizing computers that are connected to the Internet and/or other peer devices. Automobiles may rely upon complex on-board computing devices/sensors, as well as remote computing services (i.e., "cloud" services). Eventually, automobiles equipped in this manner may report contextual information, such as location information, time of day, passenger information, traffic information, road quality information, to the cloud to make optimal routing and other decisions for the car. Users of such automobiles will become more dependent on real-time context sensitive data brought to their cars from the cloud. Additionally, there will be more sources of information available to cloud-based services from automobile sensors, as well as sensors in the smart devices (e.g. phones, tablets, wearables) carried by automobile passengers. Such crowd-sourced information could be useful for identifying and investigating automobile failures, automotive accidents, and illegal smart device usage.

SUMMARY

Various embodiments and implementations include methods of context-based monitoring of sensors by computing devices. Various embodiments may include a first computing device obtaining an output of a first sensor and determining whether an anomaly event is likely to occur based, at least in part on the obtained output of the first sensor. Various embodiments may further include transmitting a message configured to cause receiving computing devices to log output of sensors of the receiving computing devices in response to determining that the anomaly event is likely to occur.

Some embodiments may further include the first computing device determining whether the anomaly event occurred, transmitting a sensor output request in response to determining that the anomaly event did occur, and receiving, by the first computing device, sensor output data from the receiving computing devices. Some embodiments may further include the first computing device correlating the output of the first sensor and sensor output data received from the receiving computing devices, and generating an incident report based on correlated sensor output. Some embodiments may further include the first computing device transmitting the generated incident report from the first computing device to a remote server. Some embodiments may further include the first computing device storing the generated incident report in a memory on the first computing device. Some embodiments may further include the first computing device transmitting the generated incident report to the receiving computing devices. Some embodiments may further include the first computing device determining one or more types of sensor outputs likely to provide information relevant to the anomaly event determined likely to occur, in which the transmitted message indicates one or more types of sensor outputs to be logged by the receiving computing devices.

In some embodiments, the transmitted message may be broadcast for reception by nearby computing devices. In some embodiments, the transmitted message may be transmitted to computing devices determined by the first computing device to be likely to record sensor data relevant to the anomaly event. In some embodiments, determining that the anomaly event is likely to occur based on the obtained output of the first sensor may include comparing the output of the first sensor to a behavior model trained by the first computing device.

Various embodiments include a computing device including a sensor, a transceiver, a memory and a processor configured with processor-executable instructions to perform operations of methods summarized below. In some embodiments, the first computing device may be within an automobile. Various embodiments include a computing device including means for performing functions of methods summarized below. Various embodiments include a non-transitory processor-readable medium on which is stored processor-executable instructions configured to cause a processor of a computing device to perform operations of methods summarized below.

BRIEF DESCRIPTION OF THE DRAWINGS

The accompanying drawings, which are incorporated herein and constitute part of this specification, illustrate embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "communication device" and "computing device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, smart appliances, automobiles, unmanned aerial vehicles (UAV), smart fixtures, smart traffic monitors, smart clothing, smart wearable devices such as glasses and jewelry, and similar electronic devices that include a programmable processor, one or more sensors, and circuitry for establishing wireless communication pathways and transmitting/receiving data via wireless communication pathways. The various aspects may be useful in communication devices, such as mobile communication devices (e.g., smart cars, smart appliances, smart wearables, smart phones), and so such devices are referred to in the descriptions of various embodiments.

Communication devices, such as mobile communication devices (e.g., smart phones, smart cars, smart clothing, etc.), may use a variety of interface technologies, such as wired interface technologies (e.g., Universal Serial Bus (USB) connections, etc.) and/or air interface technologies (also known as radio access technologies)(e.g., Third Generation (3G), Fourth Generation (4G), Long Term Evolution (LTE), Edge, Bluetooth, Near Field Communications, Wi-Fi, satellite, etc.). Communication devices may establish connections to a network, such as the Internet, via more than one of these interface technologies at the same time (e.g., simultaneously). For example, a mobile communication device may establish an LTE network connection to the Internet via a cellular tower or a base station at the same time that the mobile communication device may establish a wireless local area network (WLAN) network connection (e.g., a Wi-Fi network connection) to an Internet connected Wi-Fi access point. The capability of communication devices to establish two different network connections at the same time may enable solutions for wired and wireless communications devices for network probing by determining a number of Network Address Translators within a network access path.

Over the past several years, every day electronic devices have become increasingly "smart," including one or more communications modalities and a variety of sensors for perceiving and monitoring a surrounding environment. Smartphones include accelerometers, gyroscopes, and barometers in addition to microphones and cameras. Smart fitness wearable devices may include pulse monitors, temperature gauges, and other biometric sensors. The output of such sensors may be analyzed by the smart fitness wearable device or a computing device in wireless communication with the smart fitness wearable device to detect potential health problems of a user. However, the sensor information available to such smart devices when analyzing sensor output may be limited to only that information obtained by the device itself.

One of the most complex computing devices available for regular public use is the modern automobile. Automobiles have been transformed into a powerful and complex electromechanical systems that include processors, sensors, and systems-on-chips (SOCs) to control many of the automobile's functions, features, and operations. Manufacturers now equip their automobiles with Advanced Driver Assistance Systems (ADASs) that automate, adapt, or enhance the automobile's operations. For example, an ADAS may be configured to use information collected from the automobile's sensors (e.g., accelerometer, radar, lidar, geospatial positioning, etc.) to automatically detect a potential road hazard, and assume control over all or a portion of the automobile's operations (e.g., braking, steering, etc.) to avoid detected hazards. Features and functions commonly associated with an ADAS include adaptive cruise control, automated lane detection, lane departure warning, automated steering, automated braking, and automated accident avoidance.

Modern automobiles may be equipped with a vehicle control system, which may be configured to collect and use information from the automobile's various components, systems and sensors (collectively "sensors") to monitor and automate all or a portion of the automobile's operations. The vehicle control system may also be configured to communicate with nearby computing devices (e.g., passenger wearable smart devices, smart phones, smart traffic monitoring structures, and pedestrian smart clothing) or with a server computing device in a cloud network to receive information suitable for intelligently monitoring or controlling the automobile's operations. For example, the vehicle control system may receive and use information from a Global Positioning System (GPS) system, an internal clock, and a steering sensor, to determine that the driver is travelling in the wrong direction to their place of work, and alert the driver of the inconsistency based on the sensed information. The vehicle control system may also collect and send information (vehicle information, sensor information, etc.) to other computing devices or a server computing device for analysis and use in controlling the operations of the other automobiles in the system.

In overview, the various embodiments include methods, and computing devices configured to implement the methods, for anomaly monitoring using context-based sensor output correlation. The methods may include obtaining, at a first computing device (e.g., an automobile, a smart watch, a smart traffic light, smart appliance, etc.), output of a first sensor (i.e., a sensor integrated into or in communication with the first computing device). The computing device may determine that an anomaly is likely to occur based on the obtained output of the first sensor. In response to determining that an anomaly is likely to occur, the computing device may use a transceiver to send a broadcast message indicating that receiving computing devices should log output of sensors (e.g., begin logging or store results of ongoing logging in preparation for responding to sensor output requests) of the receiving computing devices. In various embodiments, the computing device may determine whether the anomaly did occur (e.g., whether a car crash happened or a microwave overheated). In response to determining that the anomaly occurred, the computing device may use the transceiver to transmit a sensor output request. Nearby devices may receive this sensor output request and may transmit collected sensor data to the first computing device. The first computing device may receive the sensor output collected by the various receiving devices and, in some embodiments, may correlate the first sensor output with the received sensor output. The correlated data may be used by the first computing device to produce an incident report.

Various embodiments may include a first computing device such as a smart car, smart phone, wearable fitness monitor, or smart appliance. The first computing device may act as a hub, sending messages to other computing devices in proximity to the first computing device in order to initiate sensor logging by the other computing devices. For the purposes of providing a clear description, the various embodiments may be discussed with reference to a smart automobile as the first computing device. However, the various implementations and embodiments may be applied to any computing device, such as a smartphone within an automobile.

In the various embodiments, the first computing device may be configured to receive or obtain output from one or more sensors, and may analyze the obtained sensor output for patterns in automobile behavior. For example, by analyzing the output of the one or more sensors, the first computing device may determine that a particular event or anomaly, such as a collision, is likely to occur. In response, the first computing device may generate and send a generic broadcast message to nearby computing devices informing the nearby computing devices of the nature of the anomaly and/or requesting the nearby computing devices to log the output of specific sensors (e.g., to begin logging or store results of ongoing logging in preparation for responding to future sensor output requests). In response, the nearby computing devices may begin logging sensor output preemptively, in preparation for the potential occurrence of an anomaly event. Alternatively, in response to a sensor output request, the receiving computing device may prepare the results of already occurring logging for later transmission to the first computing device. If the anticipated event does occur, the first computing device may send a second broadcast message requesting nearby computing devices to transmit any sensor output data that was logged (i.e., stored in memory). Thus, the various embodiments may enable the collection of data relevant to an anomaly event prior to the actual occurrence of the event, resulting in the availability of relevant data about the anomaly event from varied sources for use in analyzing the event.

The development of autonomous and semi-autonomous automobiles may lead to autonomous communications amongst a variety of computing devices. Automobiles may, without user interaction, activate various sensors, record sensor output, and analyze automobile behavior. The automobile may further communicate with a variety of computing devices to obtain external information about automobile behavior. Thus, the information provided to automobiles by neighboring computing devices may include guidance information, environmental information, passenger or nearby human/animal information, traffic information, or a combination thereof.

A server computing device may evaluate and correlate the sensor output data received from other computing devices following the event, and may generate an incident report including and summarizing relevant data regarding the anomaly event. Such incident reports maybe useful in providing evidence to law enforcement, insurance adjustors, and automobile manufacturers regarding the nature and scope of an incident. For example, before instructing or advising automobiles to follow an alternate navigation route from that in which the driver is currently engaged, the first computing device (i.e., the automobile) may request information from the computing devices of onboard passengers. The requested information may be correlated to the route information and may be used to generate a report indicating that while the anomalous driving pattern was occurring, sensor output from passenger devices indicated that a passenger was experiencing a medical emergency.

In some embodiments, the first computing device may be configured to compare the output of one or more sensors of the first computing device to trained, pre-installed, or downloaded anomaly event models to determine a context under which the first computing device is operating. A result of the comparison may be contextual information indicating that a particular anomaly event is likely or unlikely to occur.

The first computing device may be configured to intelligently select sensors for polling in response to determining that a specific anomaly event or category of anomaly events is likely to occur. In some embodiments, the first computing device may select the types of sensors that may provide data useful in analyzing the specific anticipated event, particularly in view of the sensors available to the first computing device. The first computing device may then identify the selected types of sensors to other (e.g., nearby) computing devices to initiate recording of data from such sensors. In this manner, the various embodiments enable pre-event logging of data from sensors of other computing devices based on the content or context of a determined anomaly event and the sensor output of one or more sensors of the first computing device (e.g., GPS or steering sensors of the automobile).

In some embodiments, the first computing device may maintain records (or logs) of various anomaly events and the types or categories of sensor output most relevant to such events. For example, the first computing device may store a record associating an automobile accident involving a pedestrian with biometric sensors, cameras, traffic information, and location information so that the automobile may generate a report about the medical condition of the pedestrian before and after the collision, the location of the collision, and the traffic conditions at the collision site. Some of this information may be obtained from a smart wearable computing device of the pedestrian, while other information such as camera feedback, may be obtained from traffic cameras, other automobiles, and the like. Therefore, the first computing device may have specific knowledge of the types of sensors for which output logging is requested. This may enable targeted logging of specific information relevant to a particular type of anomaly event, and thus may present significant power and resource savings over an all encompassing recording procedure.

The first computing device may be configured to poll (i.e., request sensor output) from the selected sensors of nearby computing devices to receive sensor information that is suitable for use in monitoring the occurrence of an anticipated (i.e., likely) anomaly event. The first computing device may poll the selected sensors via unicast, multicast, broadcast, datacasting, peer transmissions, busy-wait polling, hub polling, cycle polling, periodic polling, or any polling or broadcast technique known in the art or contemplated in the future.

In some embodiments, the first computing device may poll the selected sensors by broadcasting or transmitting a broadcast message to nearby computing devices. The broadcast message may include information suitable for causing a receiving computing device to activate one or more sensors if they are inactive, and collect, store, or otherwise log sensor output information.

If a potential anomaly event actually occurs, then the first computing device may transmit, send, or broadcast a second message to nearby computing devices requesting transmission of recorded sensor output data. In response, the receiving computing devices may send the collected sensor output information to the first computing device. The word "broadcast" is used herein to mean the transmission of messages or data (files, information packets, etc.) so that the messages/data can be received by a large number of receiving devices simultaneously, and includes multicast.

The first computing device may correlate and compare the received sensor output data with sensor output from the sensors of the first computing device. For example, the first computing device may use machine learning techniques to analyze the occurrence of an anomaly event and make determinations about precursor conditions or events that can be used to predict when an anomaly event is about to occur, as well as the nature and scope of the event. The first computing device may store the results of the correlation and comparison, may transmit the results in the form of an incident report to a remote server, or to other computing devices. The incident report and collected data may be used to train anomaly event models to enable improved detection of future anomalous events.

Various implementations and embodiments may detect anomalies in data reported by a reporting automobile based on contextual and crowd-sourced data from nearby devices (vehicle sensors, smartphones in the automobile, other automobiles, etc.). The various implementations and embodiments may include a first computing device gathering contextual information from multiple sensors of the first computing device. The first computing device may analyze the data for context to recognize a potential anomaly event. The first computing device may initiate logging by sensors of nearby computing devices in response to detecting a potential anomaly event. The first computing device may combine the collected sensor outputs from sensor logging by multiple computing devices, and analyze the combined sensor output data to detect anomalies. The first computing device may transmit messages to identified devices requesting sensor output data (e.g., real-time, recorded) and/or sensor reports. Various implementations and embodiments may also transmit the combined sensor output data to a remote server or first responder system upon detection of an anomaly event.

Figure 1A:
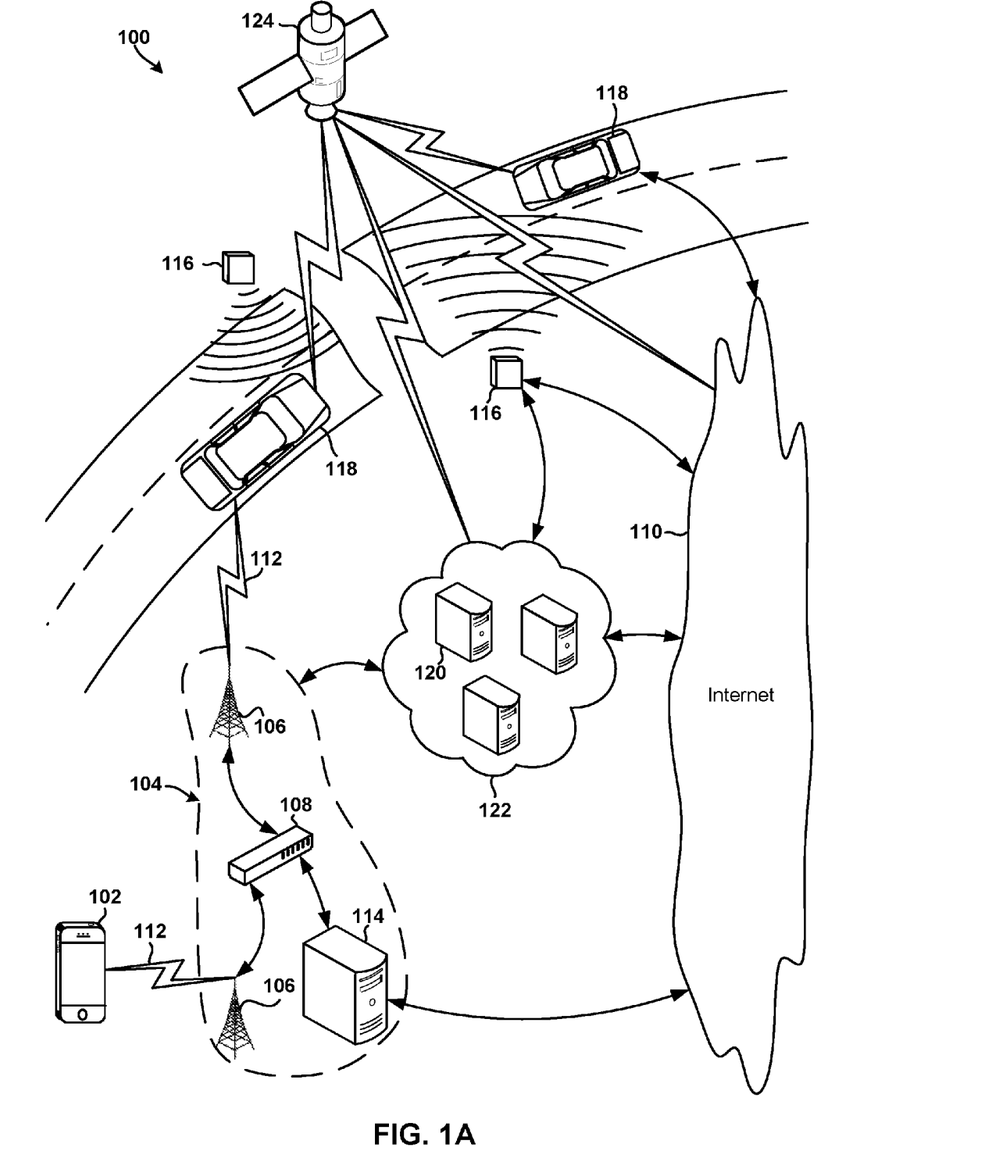
FIG. 1A is a communication system block diagram illustrating network components in an example vehicle-based system that is suitable for implementing the various embodiments.

The various embodiments may be implemented within a variety of communication systems, such as the example vehicle-based system 100 illustrated in FIG. 1A. An example cell telephone network 104 includes a plurality of cell base stations 106 coupled to a network operations center 108. The network operations center 108 operates to connect voice calls and data between mobile devices 102 (e.g., cell phones, laptops, tablets, etc.), road sensors 116, automobiles 118, and other network destinations, such as via telephone land lines (e.g., a plain ordinary telephone system (POTS) network, not shown) and the Internet 110. The telephone network 104 may also include one or more servers 114 coupled to or within the network operations center 108 that provide a connection to the Internet 110.

The automobiles 118 may include hardware and/or software components suitable for monitoring and collecting sensor information from the automobile's various sensors. Examples of automobile sensors that may be monitored include the automobile's speedometer, wheel speed sensor, torquemeter, turbine speed sensor, variable reluctance sensor, sonar system, radar system, air-fuel ratio meter, water-in-fuel sensor, oxygen sensor, crankshaft position sensor, curb feeler, temperature sensor, Hall effect sensor, manifold absolute pressure sensor, fluid sensors (e.g., engine coolant sensor, transmission fluid sensor, etc.), tire-pressure monitoring sensor, mass airflow sensor, speed sensor, throttle position sensor, blind spot monitoring sensor, parking sensor, speakers, cameras, microphones, accelerometers, compasses, GPS receivers, and other sensors for monitoring physical or environmental conditions in and around the automobile.

The automobiles 118 may include communications circuitry for communicating with a network server 120, which may be implemented as a server within the network infrastructure of a cloud service provider network 122 and connected to the Internet 110 and the telephone network 104. The automobiles 118 may also include communications circuitry for communicating with one or more satellite or space-based systems 124, such as a GPS or another navigation, or ground-based positioning systems, such as systems using the round trip time (RTT) of signals to/from access points of known location.

Communications between the network server 120, road sensors 116, and the automobiles 118 may be achieved through the telephone network 104, the Internet 110, a cloud service provider network 122, private networks (not illustrated), or any combination thereof. Communications between the automobiles 118 and the telephone network 104 may be accomplished via two-way wide-area wireless communication links 112, such as cellular telephone communication technologies and WiFi.

A number of different cellular and mobile communication services and standards are available or contemplated in the future, all of which may be used for communications of the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages.

The network server 120 may receive data and incident reports from automobiles 118, and may use the information to update anomaly event models, inform authorities about a recent anomaly event, or retain the incident report as evidence that may be requested as a later time. Each automobile 118 may include an Advanced Driver Assistance System (ADASs) that is controlled by a vehicle control system. The vehicle control system may receive sensor output indicating that the ADAS system has altered the automobile's normal operations (e.g., braking, steering, etc.) thereby indicating a potential anomaly event may be occurring. The vehicle control system may be configured to activate various sensors (e.g., accelerometer, radar, lidar, GPS receiver, roadbed sensors, etc.) to collect sensor information regarding the detected potential anomaly. In addition, the vehicle control system may be configured to collect sensor information from surrounding automobiles and computing devices periodically, on-demand, continuously, repeatedly, in response to a trigger, in response to detecting the occurrence of an event, etc.

The road sensors 116 may be configured to collect and send sensor information to the automobiles 118 upon receiving a sensor output request, in response to detecting a condition or event (e.g., a sudden change in automobile speeds, etc.), periodically, etc. The automobiles 118 may report the information received from road sensors 116 to the network server 120 and/or use the received information to make better or more informed decisions. The network server 120 may also use the information received from road sensors 116 (e.g., sensor information) to corroborate information received from other sensors, such as the incident reports received from the other road sensors 116 or automobiles 118.

Figure 1B:
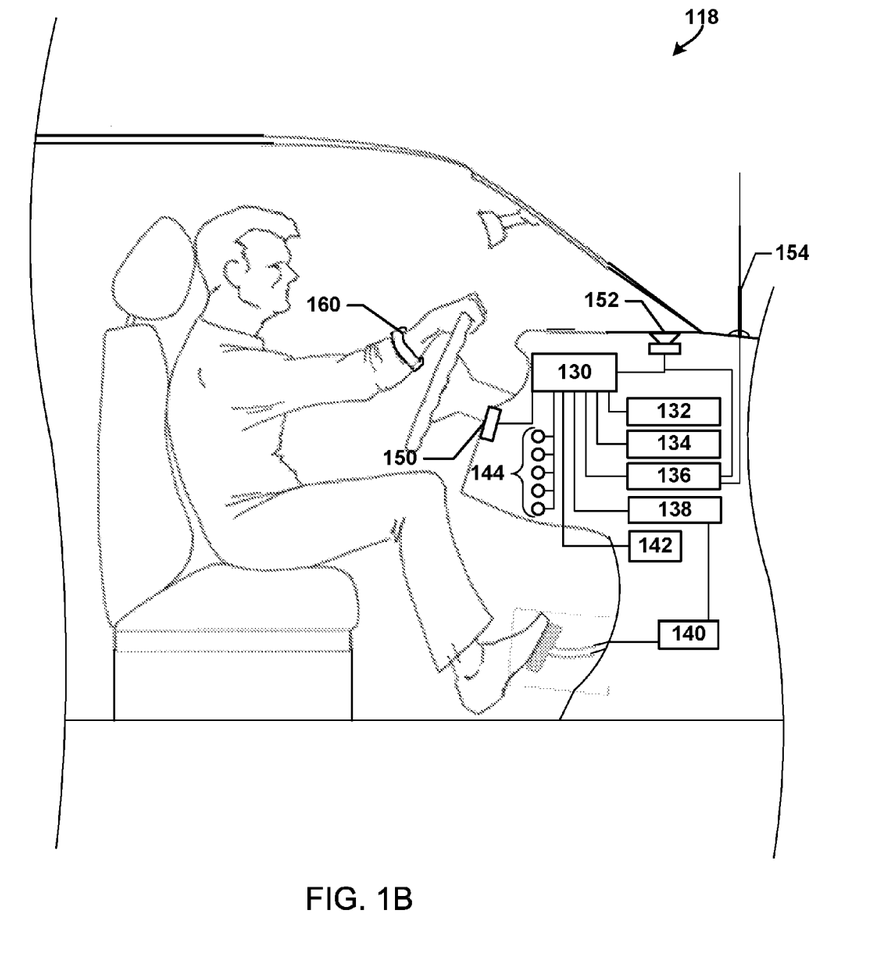
FIG. 1B is a component block diagram illustrating logical components of a vehicular control system suitable for implementing the various embodiments.

FIG. 1B is a component block diagram of an example automobile 118 including a vehicle control system 130 and various sensors suitable for interacting with a server computing device (e.g., network server 120) according to various embodiments. Automobile systems may include the vehicle control system 130 coupled to a variety of automobile systems and subsystems, such as an environmental system 132 (e.g., an air conditioning system), a navigation system 134, a voice and communications capability that may be implemented as an "infotainment" system 136, an engine control system 138, a transmission control system 142, and a variety of sensors 144. The engine control system 138 may be coupled to one or more pedal sensors 140. The vehicle control system 130 may communicate with the server computing device and one or more nearby computing devices, such as a wearable computing device 160, using the infotainment system 136. The infotainment system 136 may be coupled to an antenna 154 to send and receive data via various wireless networks, as well as receive wireless broadcasts. The vehicle control system 130 and the infotainment system 136 may be coupled to a speaker 152 to generate sound within the automobile. The navigation system 134 may be coupled to a display 150 to display automobile status/control and navigation information (e.g., a map). Each automobile systems and sensors 130-144 may communicate with one or more other systems via one or more communication links, which may include wired communication links (e.g., a Controller Area Network (CAN) protocol compliant bus, Universal Serial Bus (USB) connection, Firewire connection, etc.) and/or wireless communication links (e.g., a Wi-Fi® link, Bluetooth® link, ZigBee® link, ANT+® link, etc.).

The variety of sensors 144 coupled to the vehicle control system 130 may include any of the automobile's speedometer, wheel speed sensor, torquemeter, turbine speed sensor, variable reluctance sensor, sonar system, radar system, air-fuel ratio meter, water-in-fuel sensor, oxygen sensor, crankshaft position sensor, curb feeler, temperature sensor, Hall effect sensor, manifold absolute pressure sensor, various fluid sensors (e.g., engine coolant sensor, transmission fluid sensor, etc.), tire-pressure monitoring sensor, mass airflow sensor, speed sensor, blind spot monitoring sensor, parking sensor, cameras, microphones, accelerometers, compasses, GPS receiver, and other similar sensors for monitoring physical or environmental conditions in and around the automobile.

The aforementioned systems are presented merely as examples, and automobiles may include one or more additional systems that are not illustrated for clarity. Additional systems may include systems related additional functions of the vehicular system, including instrumentation, airbags, cruise control, other engine systems, stability control parking systems, tire pressure monitoring, antilock braking, active suspension, battery level and/or management, and a variety of other systems.

Figure 2:
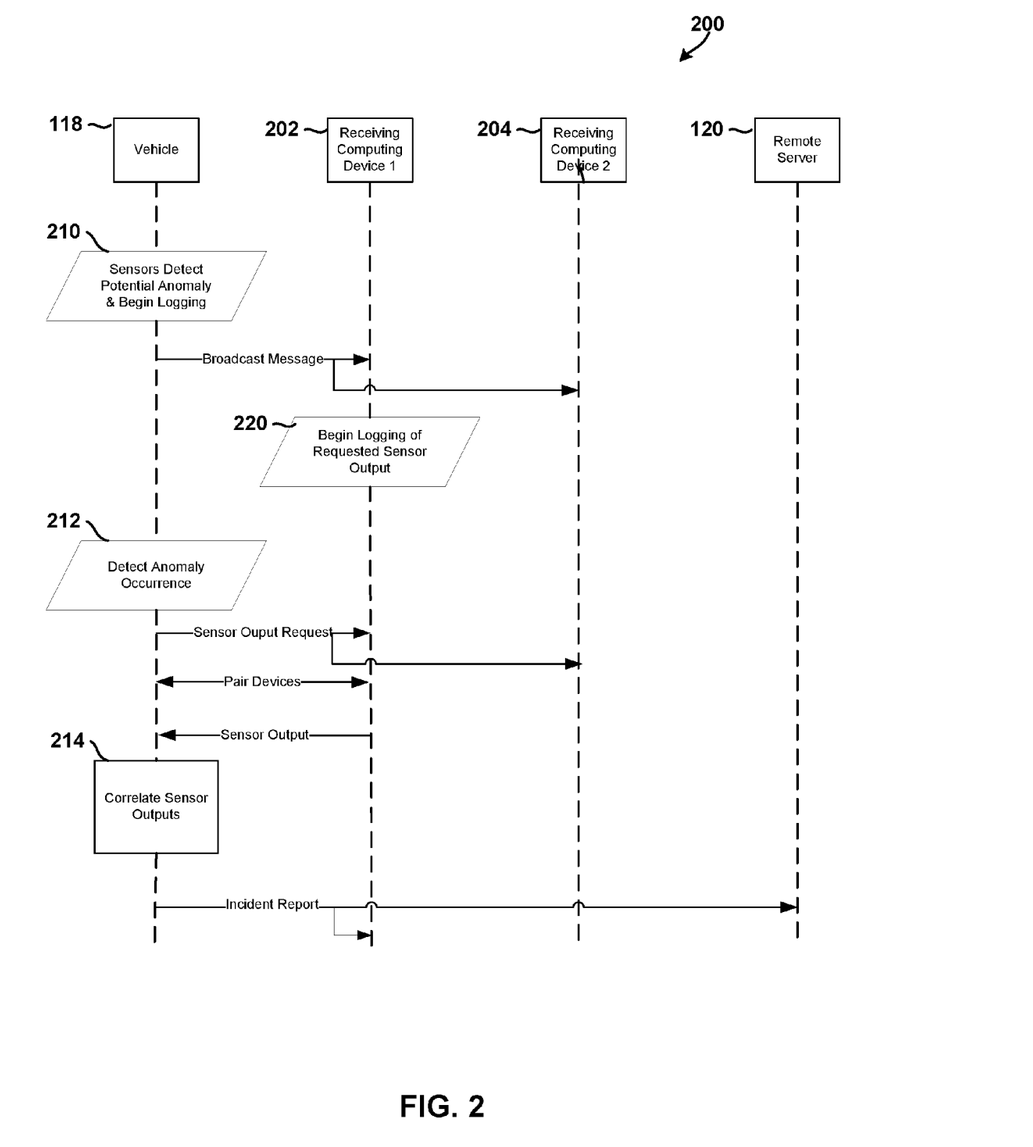
FIG. 2 is a process flow diagram illustrating a method for context based anomaly detection in accordance with an embodiment.

FIG. 2 illustrates a method 200 for the context-based ad-hoc activation of sensors to perform anomaly monitoring in accordance with various implementations and embodiments. With reference to FIGS. 1A-2, the method 200 may be implemented with the hardware and software (e.g., an infotainment system 136 and vehicle control system 130) of a computing device (e.g., the automobile 118 described with reference to FIGS. 1A-1B). For example, the method 200 may be carried out by a first computing device (e.g., automobile 118), one or more receiving computing devices 202, 204, and optionally a remote server 120.

During normal operation of the automobile 118 (or other computing device), a computing device within the vehicle may monitor various sensors (e.g. sensors 144 and the sensors of passenger computing devices such as wearable computing device 160) continuously, upon a trigger event, upon request, or periodically. The computing device may obtain and analyze information related to automobile operations and/or passenger status. Analysis of the collected sensors information may indicate that an unusual or anomalous event is likely to occur. For example, a steering sensor may produce output information indicating that the driver is steering the car in a serpentine pattern. The automobile 118 computing device may analyze the sensor output and determine that the direction of travel is unusual.

The determination by the computing device that a potential anomaly event is likely to occur may be based on a comparison of the collected automobile sensor (e.g., sensors 144) or passenger device sensors) output to one or more anomaly classifier models. Anomaly classifier models may be pre-loaded in a memory of the computing device, trained during automobile 118 operations, downloaded or otherwise installed in memory of the computing device as needed, or any combination thereof. In some implementations, an anomaly classifier model may be represented as a vector of elements, in which each element represents a feature of sensor output. In the above example, an unusual steering classifier model may contain elements indicating distance in one or more directions of travel that the car has travelled in a given time period. In a further example, the anomaly classifier model may contain elements representing degrees of steering wheel rotation in a given time period. Thus, the automobile 118 computing device may obtain the output of the steering wheel sensor and compare the output to an unusual steering anomaly classifier model and determine that a sharp, sudden turn to one side has occurred in a short period of time and may conclude that there is a strong likelihood that an accident, collision, or similar incident is likely to occur.

In various implementations, the automobile 118 computing device may train the anomaly classifier models according to regular operation of the automobile 118. Training of models over time may reduce the number of false detection of anomaly events. For example, rally car drivers make regular sharp turns throughout a race, and may accelerate into the turn rather than braking as a driver on a morning commute might. The automobile 118 computing device may observer that no accidents occur after the sharp turn is detected, and may modify an associated classifier model. As a result, the comparison of steering wheel sensor output compared against the associated unusual steering anomaly classifier model may no longer produce a result indicating that an accident is likely to occur.

In various implementations, the automobile 118 may transmit, via a transceiver coupled to an antenna (e.g., the transceiver of the infotainment system 136) modified classifier models or newly developed/trained classier models to a cloud storage, such as remote server 120. Trained models stored in a cloud-storage may be available to other automobiles for download, and may optionally be installed automatically. In this manner, anomaly classifier models may be continuously trained and improved without requiring each individual driver to experience a full range of driving experiences in order to reap the benefit of more granulated anomaly classier models.

In operation 210, the automobile 118 may compare the output of a first sensor, such as a tire skid sensor, to an appropriate anomaly classifier model and may determine that a potential anomaly is likely to occur (i.e., that the output of the sensor indicates non-standard or unusual operations/behavior). Examples of unusual sensor output may include loud or high-pitched noises coming from within the automobile or the surrounding environment, vehicle vibrations, excessive brake applications, sharp turning, or heart rate elevation as indicated by a passenger wearable computing device (e.g., wearable computing device 160) in communication with the automobile 118.

The automobile 118 computing device may determine the nature of the anomaly event based on the comparison of the sensor output to one or more anomaly classifier models. The result of the comparison is not limited to determining that a single anomaly event may be occurring. The computing device may determine that there is a possibility that multiple types of anomalies may be occurring. For example, a sudden application of the brakes may produce brake sensor output that when compared to multiple anomaly classifier models indicates that the road may be obstructed, the car may have slipped on a slick road, the driver may be suffering a health emergency, etc. The computing device may determine which anomaly events are applicable.

In response to determining that one or more anomaly events are occurring, the computing device may select sensors, the output of which is relevant to the particular type of potential anomaly event. The computing device may initiate logging by any on-board sensors that determined to be relevant to the potential anomaly event (if logging is not already occurring). The computing device may transmit, such as by transceiver of the infotainment system 136, a broadcast message to any nearby computing devices (e.g., passenger smartphones, pedestrian smart phones, smart traffic lights, road sensors, other automobiles). As is discussed in greater detail with reference to FIG. 3, the broadcast message may indicate the nature of the sensors for which output logging is requested and may optionally include the nature of the anticipated anomaly event. The broadcast message may be received by receiving computing devices 202, 204.

In various implementations, a receiving computing device 1 202 may receive the broadcast message, determine whether the device possesses the requested sensors and whether those sensors are available. In operation 220, the receiving computing device may log the output by any available sensors mentioned in the broadcast message request. Thus, the receiving computing device may either begin logging of requested sensor data, or if the relevant sensor output is already being logged, may store the sensor data in preparation for later transmission to the requesting computing device. For example, if the broadcast message indicates that microphones, cameras, and GPS information should be logged, the receiving computing device 1 202 may activate an onboard microphone and initiate recording; initiate logging by an already active GPS location sensor; and ignore the request for camera output because the device has no camera. Similarly, another receiving computing device 2 204 may receive the broadcast message request but may determine that either it does not have the sensors necessary to produce the requested output, or that the sensors are otherwise engaged in more important activities. As such, that receiving computing device 2 204 may ignore the broadcast request message and may not log sensor output.

In operation 212, the automobile 118 computing device may determine that the anomaly event did actually occur (e.g., the braking automobile did in fact skid on ice and went off the road). The actual occurrence of the event may be determined in much the same manner that the prediction of the event occurred. The computing device may use classifier models, sensor output, or machine learning techniques to gauge the nature and scope of an actual event occurrence. The computing device may then transmit a sensor output request to nearby computing devices. This sensor output request may contain specific communication connection information and may request sensor output logs from any nearby receiving computing devices that complied with the request of the broadcast message.

Like the broadcast message, the sensor output message may be received by any nearby receiving computing device. Receiving computing device 2 204 may ignore the message because it did not participate in active sensor logging. Conversely, the receiving computing device 1 202 may respond to the sensor output request by attempting to pair with the automobile 118 infotainment system 136. Once paired, the receiving computing device 1 202 may transmit its logged sensor output to the automobile computing device (e.g., the microphone and GPS location information). If the device is already paired or no direct pairing is needed, such as when both the first computing device and the receiving computing device 1 202 are connected via the same WLAN, then the receiving computing device 1 202 may skip pairing and may transmit the logged sensor output via the shared network connection to the automobile computing device.

In some implementations, the automobile 118 computing device may determine based on the actual occurrence of an anomaly event that not all of the originally requested sensor output is needed, or that different sensor output would be useful in an incident analysis. This may occur, for example, if the automobile 118 computing device originally determined that multiple anomaly events had a potential likelihood to occur, but then only one anomaly event actually occurs. Thus, the original broadcast message may have requested logging of sensor output relevant to multiple potential anomaly events, whereas the following sensor output request transmitted by the computing device may include only a subset of the originally requested sensor outputs. If an additional sensor output is requested, such as when the anomaly event that actually occurred is different in nature and scope that the predicted event, the receiving computing device 1 202 may send such output if available, or ignore the additional request.

In operation 214, the automobile 118 computing device may receive sensor output from varied computing devices (e.g., receiving computing device 1 202). The computing device may correlate these sensor outputs with its own logged sensor output and may generate an incident report. The incident report may optionally group data by type of sensor output, may correlate by location, time, observational position or other criteria. In this way, the automobile computing device may build a report of how an incident was perceived and recorded from multiple viewpoints by multiple devices. Such incident reports may provide a highly detailed summary of the facts surrounding an incident, without requiring an exhaustive analysis of all sensor output of proximal computing devices. Thus, the method 200 may enable resource efficient, dynamic sensor logging in anticipation of specific anomaly event occurrence in order to monitor and log the event occurrence.

Figure 3:
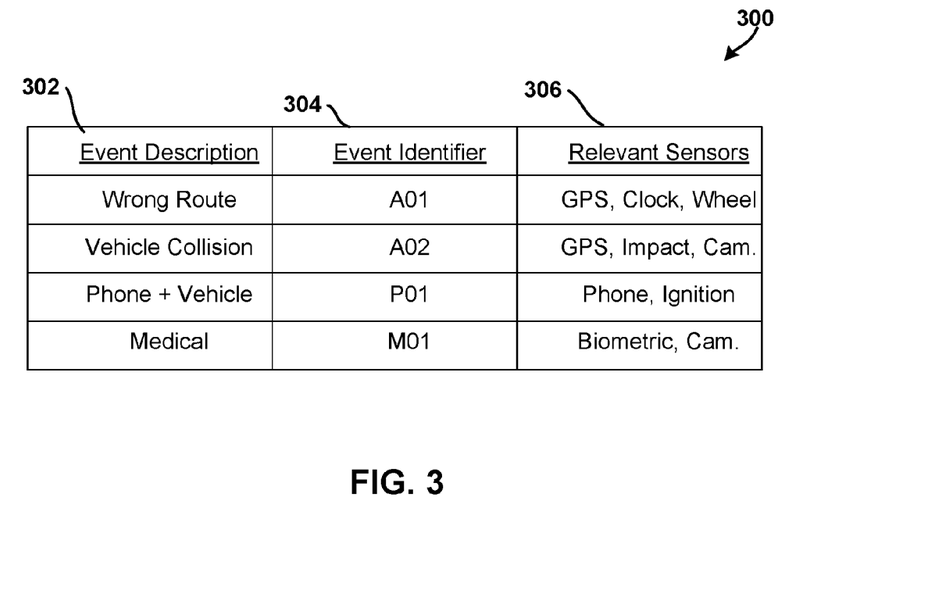
FIG. 3 is an example data structure for tracking sensors used in monitoring anomalies in accordance with an embodiment.

FIG. 3 illustrates a data structure 300 for maintaining anomaly event and sensor associations in accordance with the various implementations and embodiments. With reference to FIGS. 1A-3, the data structure 300 may be implemented with the hardware and software (e.g., vehicle control system 130) of a computing device (e.g., a computing device in the automobile 118 described with reference to FIGS. 1A-1B). For example, the data structure 300 may be maintained in a volatile or non-volatile memory coupled to the vehicle control system 130 of automobile 118, or other first computing device.

In various implementations, the first computing device (e.g., automobile 118 computing device) may maintain a data structure containing associations of different types or categories of anomaly events to relevant sensor information. In data structure 300, a database or other organizational data structure may contain entries for event descriptions 302, event identifiers 304, and relevant sensor output 306. The first computing device may utilize the data structure 300 after determining that one or more potential anomaly events are likely to occur in order to select sensors from which, output is relevant to monitoring the anomaly event. The first computing device may include a listing of these sensors in the broadcast message transmitted to nearby computing devices. For example, if the first computing device determines that both a medical emergency and an automobile collision are likely to occur, the first computing device (e.g., automobile 118) may utilize the data structure 300 entries in generating a broadcast message containing a listing of GPS information, impact sensors, cameras, biometric sensors.

In various implementations, the first computing device may access the data structure 300 again before generating a sensor output request. The first computing device may determine based on the data structure 300, the sensor output likely to be relevant to an anomaly event that actually occurred. The first computing device may compare these sensors to the listing of sensors provided in a broadcast message associated with the occurrence. If the listing of relevant sensors is different, the first computing device may include in the sensor output request those sensors from which output is likely to be relevant to the anomaly event that actually occurred.

In various implementations, the first computing device may include the event descriptor and/or an event identifier in a broadcast message or sensor output message. This may provide additional information to receiving computing devices that enables the collection of more detailed or additional sensor data.

In various implementations, the first computing device may update the data structure 300 to reflect changes in relevant sensor information as anomaly classifier models are trained, or as sensors are added or removed from the device.

Figure 4:
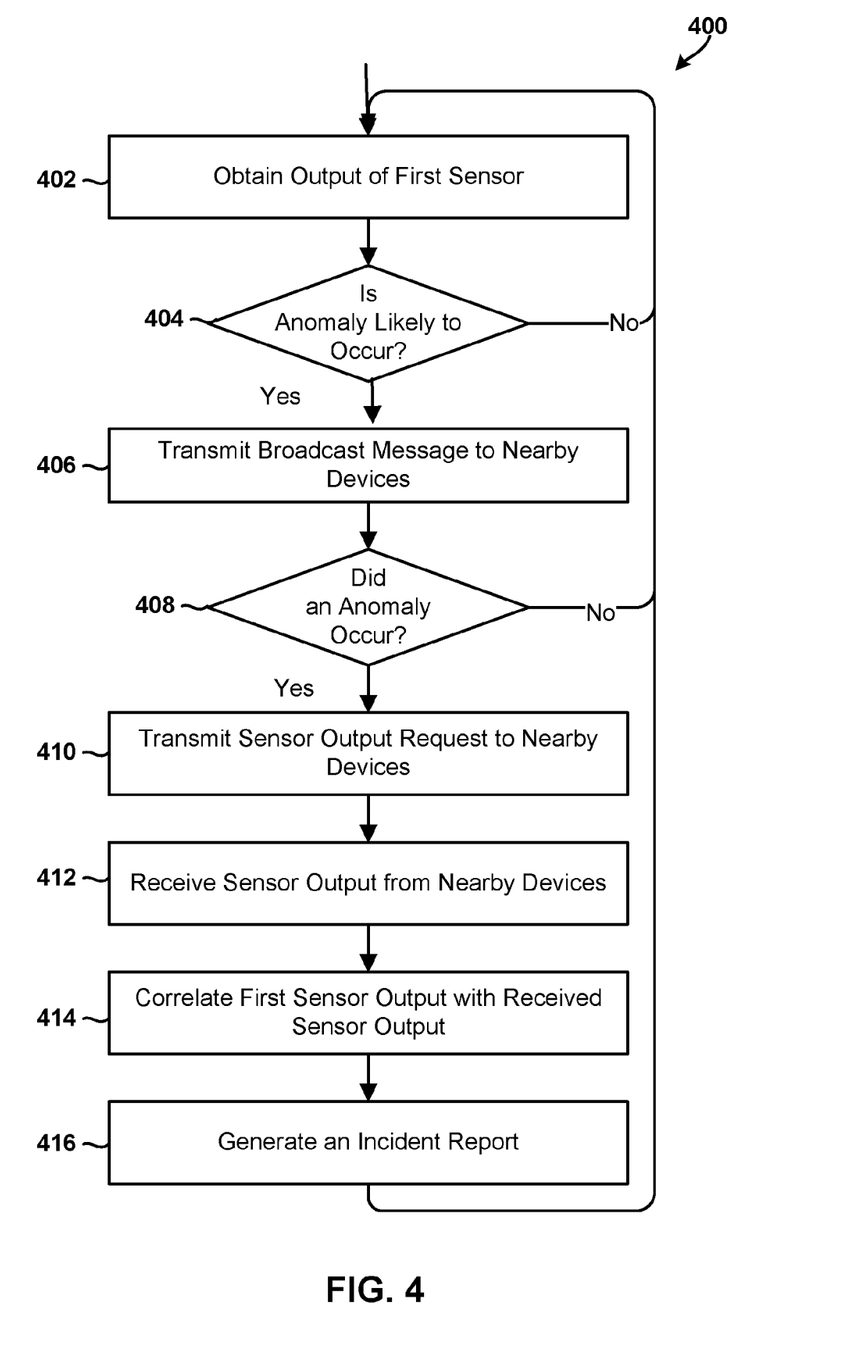
FIG. 4 is a process flow diagram illustrating a method of detecting and monitoring an anomaly event using context-based sensor logging in accordance with another embodiment.

FIG. 4 illustrates a method 400 for the context-based ad-hoc activation of sensors to preemptively perform anomaly monitoring in accordance with the various implementations and embodiments. With reference to FIGS. 1A-4, the method 400 may be implemented with the hardware and software (e.g., an infotainment system 136 and vehicle control system 130) of a computing device (e.g., the automobile 118 described with reference to FIGS. 1A-1B). For example, the method 200 may be carried out by a first computing device (e.g., a computing device of an automobile 118), one or more receiving computing devices 202, 204, and optionally the remote server 120.

In block 402, the first computing device may obtain the output of a first sensor. The output of the first sensor may be collected during the normal course of device operation, or may be requested in response to an event. The first sensor may be integrated into the first computing device or may be associated with a computing device (e.g., wearable computing device 160) in communication with the first computing device.

In determination block 404, the first computing device may determine whether an anomaly event is likely to occur based on the output of the first sensor. As discussed with reference to FIG. 2, the first computing device may compare the output of the first sensor to one or more anomaly classifier models to determine whether the output is consistent with normal device operations and/or user behavior. The first computing device may determine that no events are likely to occur, that a single event is likely to occur, or that multiple events are likely to occur.

In response to determining that an anomaly event is not likely to occur (i.e., block 404="No"), the first computing device may continue to monitor the output of the first sensor (as well as other sensors) in block 402.

In response to determining that an anomaly event is likely to occur (i.e., block 404="Yes"), the first computing device may transmit a broadcast message to nearby computing devices in block 406 (e.g., receiving computing devices 202, 204). The broadcast message may be a general broadcast or push message, not directed at any particular receiving device. The message may contain information related to the type of sensor output that the first computing device would like to collect, based on the type of anomaly event detected in block 404. The first computing device may also activate additional sensors of its own, and/or begin logging additional sensors that are already active. In some embodiments the broadcast request may be transmitted to nearby computing devices that are determined by the first computing device to be likely to record, measure, have available, be or capable of providing sensor output data relevant to the potential anomaly event.

In determination block 408, the first computing device may determine whether an anomaly event actually occurred. This may be accomplished by monitoring selected sensors determined to produce data characteristic of the anticipated event, such as accelerometers, microphones, airbag initiators, etc.

In response to determining that no anomaly event occurred (i.e., block 408="No"), the first computing device may continue to monitor the output of the first sensor (as well as other sensors) in block 402.

In response to determining that an anomaly event did occur, regardless of whether the actual event matches with any of the predicted anomaly events, (i.e., block 408="Yes"), the first computing device may transmit a sensor output request to nearby computing devices in block 410 (e.g., receiving computing devices 202, 204). The sensor output request message may provide communication information associated with the first computing device to enable receiving devices to transmit collected sensor output information to the first computing device. In various embodiments the sensor output request may be transmitted to nearby computing devices that are determined by the first computing device to record, measure, have available, be or capable of providing sensor output data relevant to the potential anomaly event.

In block 412, the first computing device may receive sensor output from nearby computing devices, and correlate, compare, corroborate, and otherwise analyze the received sensor output data with the first computing device's own collected sensor output in block 414.

In block 416, the first computing device may generate an incident report summarizing, categorizing, or otherwise listing the results of the correlation of the received sensor output to the sensor output of the first computing device's own sensors. In some implementations, the incident report may be stored in memory of the first computing device, transmitted to nearby computing devices (e.g., receiving computing devices 202, 204), and/or transmitted to a remote server (e.g., remote server 120).

The first computing device may continue to monitor the output of the first sensor (as well as other sensors) in block 402.

Figure 5:
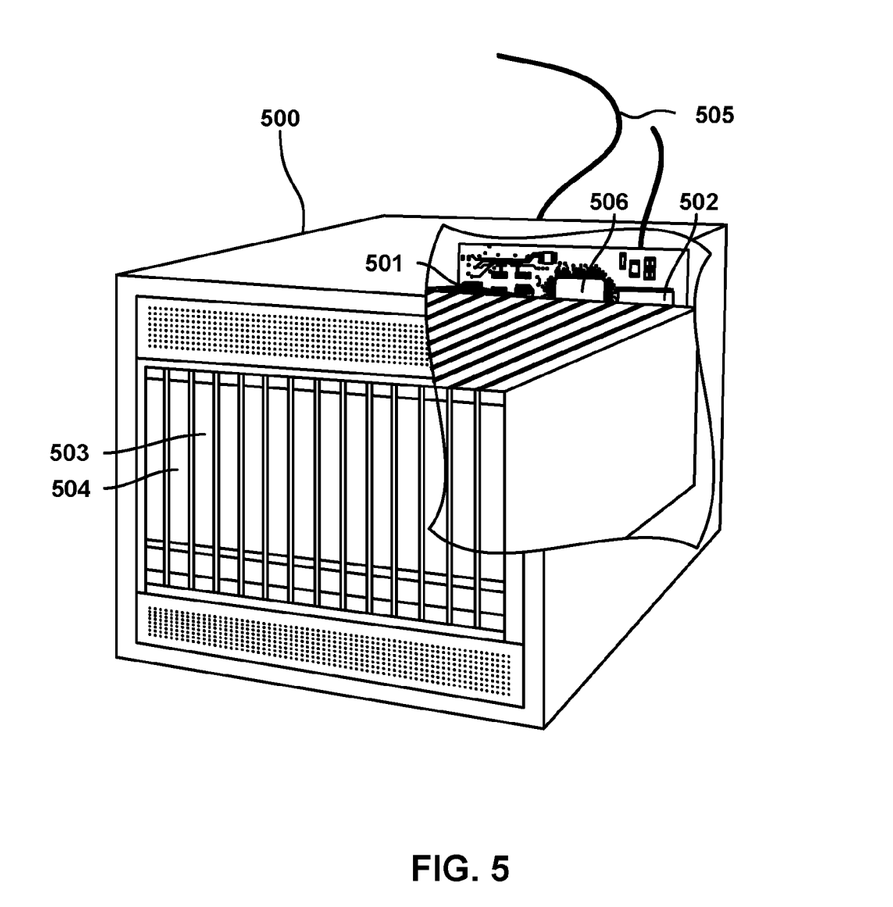
FIG. 5 is a component block diagram of a server device suitable for implementing various embodiments.

The various embodiments may be implemented on any of a variety of commercially available server devices, such as the server 500 illustrated in FIG. 5. Such a server 500 typically includes a processor 501 coupled to volatile memory 502 and a large capacity nonvolatile memory, such as a disk drive 503. The server 500 may also include a floppy disc drive, compact disc (CD) or digital versatile disc (DVD) disc drive 504 coupled to the processor 501. The server 500 may also include network access ports 506 coupled to the processor 501 for establishing data connections with a network 505, such as a local area network coupled to other broadcast system computers and servers.

The processor 501 may be any programmable microprocessor, microcomputer or multiple processor chip or chips that can be configured by software instructions (applications) to perform a variety of functions, including the functions of the various embodiments described below. In some mobile devices, multiple processors 501 may be provided, such as one processor dedicated to wireless communication functions and one processor dedicated to running other applications. Typically, software applications may be stored in the internal memory 502 before they are accessed and loaded into the processor 501. The processor 501 may include internal memory sufficient to store the application software instructions.

Figure 6:
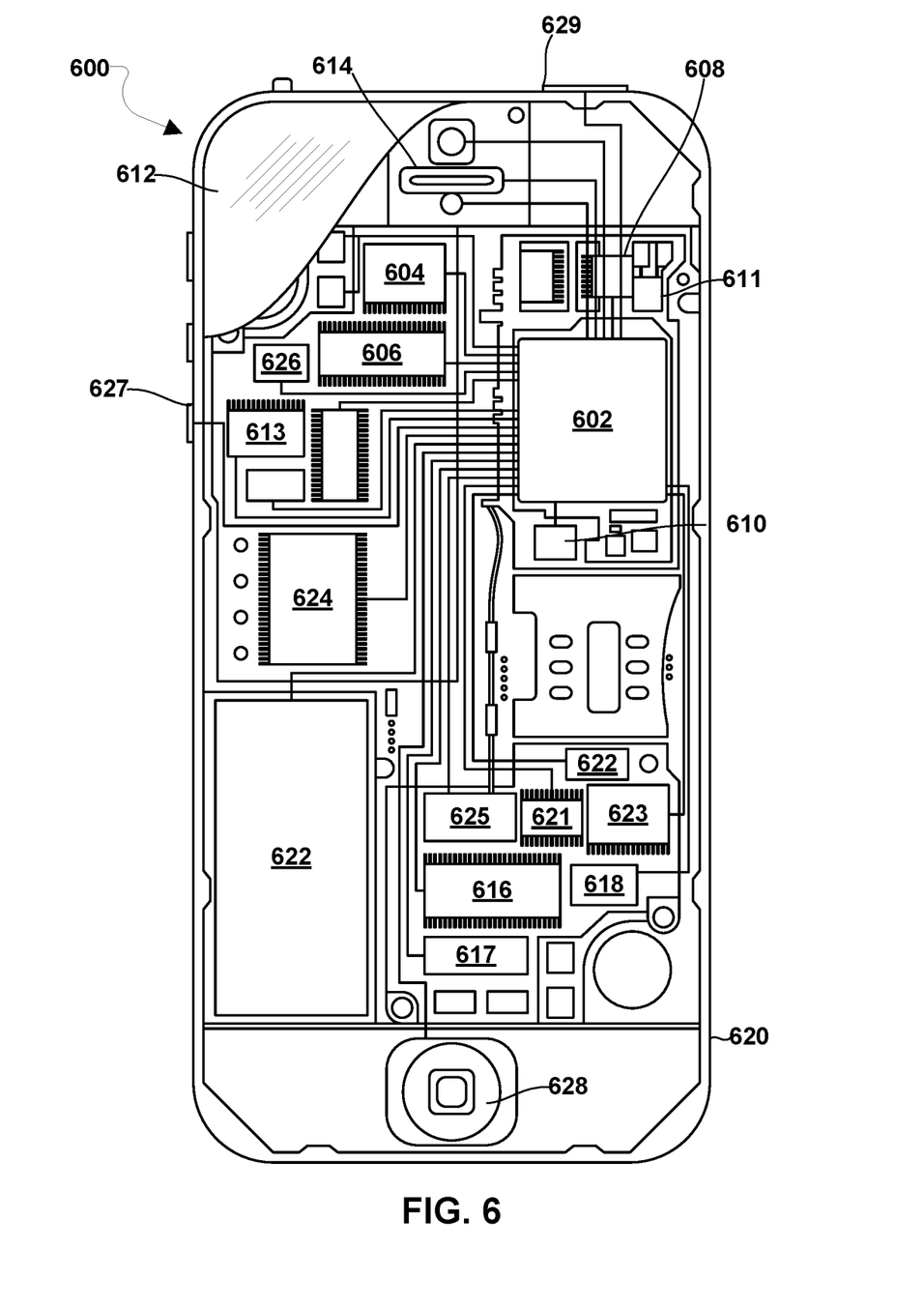
FIG. 6 is a component block diagram of a communication device suitable for implementing some embodiments.

Various embodiments may be implemented in any of a variety of computing devices, an example on which (e.g., communication device 600) is illustrated in FIG. 6. With reference to FIGS. 1-6, the communication device 600 may be similar to the mobile device 102 and may implement the method 200 and/or the method 400 as described.

The communication device 600 may include a processor 602 coupled to a touchscreen controller 604 and an internal memory 606. The processor 602 may be one or more multi-core integrated circuits designated for general or specific processing tasks. The internal memory 606 may be volatile or non-volatile memory, and may also be secure and/or encrypted memory, or unsecure and/or unencrypted memory, or any combination thereof. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the communication device 600 need not have touch screen capability.

The communication device 600 may have one or more cellular network transceivers 608 coupled to the processor 602 and to one or more antennae 610 and configured for sending and receiving cellular communications. The cellular network transceiver 608 and the antenna 610 may be used with the circuitry mentioned herein to implement the methods of various embodiments. The communication device 600 may include one or more subscriber identity module (SIM) cards (e.g., SIM 613) coupled to the cellular network transceiver 608 and/or the processor 602 and configured as described. The communication device 600 may include a cellular network wireless modem chip 617 that enables communication via a cellular network and is coupled to the processor 602.

The communication device 600 may have one or more WLAN transceivers 616 (e.g., one or more Wi-Fi transceivers) coupled to the processor 602 and to one or more antennae 611 and configured for sending and receiving WLAN communications. The transceiver 616 and the antenna 611 may be used with the circuitry mentioned herein to implement the methods of various embodiments. The communication device 600 may include a WLAN wireless modem chip 618 that enables communication via WLAN and is coupled to the processor 602.

The communication device 600 may have one or more Bluetooth transceivers 621 coupled to the processor 602 and to one or more antennae 629 and configured for sending and receiving Bluetooth communications. The Bluetooth transceiver 621 and the antenna 629 may be used with the circuitry mentioned herein to implement the methods of various embodiments. The communication device 600 may include a Bluetooth wireless modem chip 623 that enables communication via Bluetooth and is coupled to the processor 602.

The communication device 600 may have one or more satellite transceivers 624 coupled to the processor 602 and to one or more antennae 625 and configured for sending and receiving Bluetooth communications. The satellite transceiver 624 and the antenna 625 may be used with the circuitry mentioned herein to implement the methods of various embodiments. The communication device 600 may include a satellite wireless modem chip 626 that enables communication via satellite networks and is coupled to the processor 602.

The communication device 600 may also include speakers 614 for providing audio outputs. The communication device 600 may also include a housing 620, constructed of a plastic, metal, or a combination of materials, for containing all or some of the components discussed herein. The communication device 600 may include a power source 622 coupled to the processor 602, such as a disposable or rechargeable battery. The rechargeable battery may also be coupled to the peripheral device connection port to receive a charging current from a source external to the communication device 600. The peripheral device connection port, such as a USB port, may be connected to the processor 602, and may be configured to established wired network connections via wired interface technologies and may be used with the circuitry mentioned herein to implement the methods of the various embodiments. The communication device 600 may also include a physical button 628 for receiving user inputs. The communication device 600 may also include a power button 627 for turning the communication device 600 on and off.

A number of different broadcast standards are available or contemplated in the future, any or all of which may be used various embodiments. Such services and standards include, e.g., Open Mobile Alliance Mobile Broadcast Services Enabler Suite (OMA BCAST), MediaFLO®, Digital Video Broadcast IP Datacasting (DVB-IPDC), Digital Video Broadcasting-Handheld (DVB-H), Digital Video Broadcasting-Satellite services to Handhelds (DVB-SH), Digital Video Broadcasting-Handheld 2 (DVB-H2), Advanced Television Systems Committee-Mobile/Handheld (ATSC-M/H), and China Multimedia Mobile Broadcasting (CMMB). Each of these broadcast formats involves, for example, a broadcast communication channel.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples, and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein but is to be accorded the widest scope consistent with the following claims and the principles and novel features disclosed herein.

What is claimed is:

1. A method of context-based monitoring of sensors, comprising:
   obtaining, by a first computing device, an output of a first sensor;
   determining, by the first computing device, whether an anomaly event is likely to occur based, at least in part, on the obtained output of the first sensor;
   transmitting, prior to occurrence of the anomaly event, a message to at least a second computing device, wherein the message is configured to cause the at least second computing device to log output of sensors of the at least second computing device in response to determining that the anomaly event is likely to occur; and
   transmitting, by the first computing device, a sensor output request in response to determining that the anomaly event occurred, wherein the sensor output request is configured to cause the at least second computing device to transmit, to the first computing device, sensor output data including the logged output of the sensors of the at least second computing device.

2. The method of claim 1, further comprising:
   determining, by the first computing device, whether the anomaly event occurred;
   and
   receiving, by the first computing device, sensor output data from the at least second computing device.

3. The method of claim 2, further comprising:
   correlating, by the first computing device, the output of the first sensor and sensor output data received from the at least second computing device; and
   generating, by the first computing device, an incident report based, at least in part, on correlated sensor output.

4. The method of claim 3, further comprising transmitting the generated incident report from the first computing device to a remote server.

5. The method of claim 3, further comprising storing the generated incident report in a memory on the first computing device.

6. The method of claim 3, further comprising transmitting the generated incident report to the at least second computing device.

7. The method of claim 1, further comprising determining one or more types of sensor outputs likely to provide information relevant to the anomaly event determined likely to occur, wherein the transmitted message indicates one or more types of sensor outputs to be logged by the at least second computing device.

8. The method of claim 1, wherein the transmitted message is broadcast for reception by nearby computing devices, including the at least second computing device.

9. The method of claim 1, wherein the transmitted message is transmitted to computing devices, including the at least second computing device, determined by the first computing device to be likely to record, measure, have available, or be capable of providing sensor data relevant to the anomaly event.

10. The method of claim 1, wherein the first computing device is within an automobile.

11. The method of claim 1 wherein determining, by the first computing device, that the anomaly event is likely to occur based, at least in part, on the obtained output of the first sensor comprises:
comparing, by the first computing device, the output of the first sensor to a behavior model.

12. A computing device, comprising:
a sensor;
a transceiver; and
a processor coupled to the sensor, and the transceiver, and configured with processor-executable instructions to perform operations comprising:
obtaining an output from the sensor;
determining whether an anomaly event is likely to occur based, at least in part, on the obtained output of the sensor;
transmitting, via the transceiver, prior to occurrence of the anomaly event, a message to at least a second computing device, wherein the message is configured to cause the at least second computing device to log output of sensors of the at least second computing device in response to determining that the anomaly event is likely to occur; and
transmitting a sensor output request in response to determining that the anomaly event occurred, wherein the sensor output request is configured to cause the at least second computing device to transmit, to the computing device, sensor output data including the logged output of the sensors of the at least second computing device.

13. The computing device of claim 12, wherein the processor is configured with processor-executable instructions to perform operations further comprising:
determining whether the anomaly event occurred; and
receiving sensor output data from the at least second computing device.

14. The computing device of claim 13, wherein the processor is configured with processor-executable instructions to perform operations further comprising:
correlating the output of the first sensor and sensor output data received from the at least second computing device; and
generating an incident report based, at least in part, on correlated sensor output.

15. The computing device of claim 14, wherein the processor is configured with processor-executable instructions to perform operations further comprising transmitting the generated incident report to a remote server.

16. The computing device of claim 14, wherein the processor is configured with processor-executable instructions to perform operations further comprising storing the generated incident report in the memory.

17. The computing device of claim 14, wherein the processor is configured with processor-executable instructions to perform operations further comprising transmitting the generated incident report to the at least second computing device.

18. The computing device of claim 12, wherein the processor is configured with processor-executable instructions to perform operations further comprising determining one or more types of sensor outputs likely to provide information relevant to the anomaly event determined likely to occur, wherein the transmitted message indicates one or more types of sensor outputs to be logged by the at least second computing device.

19. The computing device of claim 12, wherein the processor is configured with processor-executable instructions to perform operations such that the transmitted message is broadcast for reception by nearby computing devices, including the at least second computing device.

20. The computing device of claim 12, wherein the processor is configured with processor-executable instructions to perform operations such that the transmitted message is transmitted to computing devices, including the at least second computing device, determined by the first computing device to be likely to record, measure, have available, or be capable of providing sensor data relevant to the anomaly event.

21. The computing device of claim 12, wherein the computing device is within an automobile.

22. The computing device of claim 12 wherein the processor is configured with processor-executable instructions to perform operations such that determining that the anomaly event is likely to occur based, at least in part, on the obtained output of the sensor comprises comparing the output of the sensor to a behavior model.

23. A computing device, comprising:
means for obtaining an output from a sensor;
means for determining whether an anomaly event is likely to occur based, at least in part, on the obtained output of the sensor;
means for transmitting, prior to occurrence of the anomaly event, a message to at least a second computing device, wherein the message is configured to cause the at least second computing device to log output of sensors of the at least second computing device in response to determining that the anomaly event is likely to occur; and
means for transmitting a sensor output request in response to determining that the anomaly event occurred, wherein the sensor output request is configured to cause the at least second computing device to transmit, to the computing device, sensor output data including the logged output of the sensors of the at least second computing device.

24. The computing device of claim 23, further comprising:
means for determining whether the anomaly event occurred; and
means for receiving sensor output data from the at least second computing device.

25. The computing device of claim 24, further comprising:
means for correlating the output of the first sensor and sensor output data received from the at least second computing device, and
means for generating an incident report based, at least in part, on correlated sensor output.

26. The computing device of claim 25, further comprising means for transmitting the generated incident report to a remote server.

27. The computing device of claim 25, further comprising means for storing the generated incident report.

28. The computing device of claim 25, means for further comprising transmitting the generated incident report to the at least second computing device.

29. The computing device of claim 23, further comprising means for determining one or more types of sensor outputs likely to provide information relevant to the anomaly event determined likely to occur, wherein the transmitted message indicates one or more types of sensor outputs to be logged by the at least second computing device.

30. A non-transitory processor-readable medium having stored thereon processor-executable instructions configured to cause a processor of a computing device to perform operations comprising:

obtaining an output from a sensor;

determining whether an anomaly event is likely to occur based, at least in part, on the obtained output of the sensor;

transmitting, prior to occurrence of the anomaly event, a message to at least a second computing device, wherein the message is configured to cause the at least second computing device to log output of sensors of the at least second computing device in response to determining that the anomaly event is likely to occur; and transmitting a sensor output request in response to determining that the anomaly event occurred, wherein the sensor output request is configured to cause the at least second computing device to transmit, to the computing device, sensor output data including the logged output of the sensors of the at least second computing device.

\* \* \* \* \*